United States Patent [19]

Cox et al.

[11] Patent Number: 4,599,566

[45] Date of Patent: Jul. 8, 1986

[54] HIGH TRANSMITTING POWER DEEP PENETRATION WELL LOGGING SONDE

[75] Inventors: Percy T. Cox; Wayne F. Warren, both of Houston, Tex.

[73] Assignee: Texaco Inc., White Plains, N.Y.

[21] Appl. No.: 480,639

[22] Filed: Mar. 31, 1983

[51] Int. Cl.⁴ .............................................. G01V 3/10
[52] U.S. Cl. .................................................. 324/341
[58] Field of Search ............... 324/338, 339, 340, 341, 324/323; 340/854

[56] References Cited

U.S. PATENT DOCUMENTS

| | | | |
|---|---|---|---|
| 4,107,598 | 8/1978 | Meador et al. | 324/341 |
| 4,360,778 | 11/1982 | Freedman | 324/341 |
| 4,389,645 | 6/1983 | Wharton | 340/854 |
| 4,451,789 | 5/1984 | Meador | 324/338 |

Primary Examiner—Ernest F. Karlsen
Assistant Examiner—Walter E. Snow
Attorney, Agent, or Firm—Robert A. Kulason; Ronald G. Gillespie

[57] ABSTRACT

An improvement to a conventional one transmitter coil-two receiver coil dielectric well logging sonde permits the well logging sonde to have deeper penetration of the earthen formation when measuring dielectric constants. The improvement includes increased spacing between the receiver coils and the transmitter coil and operation of the transmitter coil at a higher power level.

3 Claims, 2 Drawing Figures 4,599,566

HIGH TRANSMITTING POWER DEEP PENETRATION WELL LOGGING SONDE

FIELD OF THE INVENTION

The present invention relates to well logging sondes in general and, more particularly, to well logging systems which transmit electromagnetic energy into the earth formation and receive that energy at another location from the earth's formation.

BACKGROUND OF THE INVENTION

Fluid invaded zones have long been a problem in the field of dielectric well logging. The problem can be summed up simply by how far into the formation can the dielectric well logging be effective until the invading fluids affect the measurements. U.S. Pat. No. 4,209,747 has issued in which its approach to the solution of the problem for an improvement in the measurement, is to use four receiver coils in conjunction with the transmitter coil. The present invention utilizes a conventional type logging sonde that has been improved to achieve deeper penetration, that is, the depth into the formation before the invading fluid materially affects the dielectric constant reading is greater with the present invention than with the conventional logging sonde.

SUMMARY OF THE INVENTION

An improvement to a conventional one transmitter coil-two receiver coil dielectric well logging sonde permits the well logging sonde to have deeper penetration of the earthen formation for measuring dielectric constants. The improvement includes increased spacing between the receiver coils and the transmitter coil and operation of the transmitter coil at a higher power level.

The objects and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustration purposes only and are not be construed as defining the limits of the invention.

DESCRIPTION OF THE INVENTION

A conventional type dielectric logging system such as that described and disclosed in U.S. Pat. No. 4,107,598, encounters problems of dielectric measurement in fluid invaded zones in the earth formations. The present invention represents an improvement on the system of the aforementioned U.S. patent to improve the dielectric measurements in fluid invaded zones.

Figure 1:
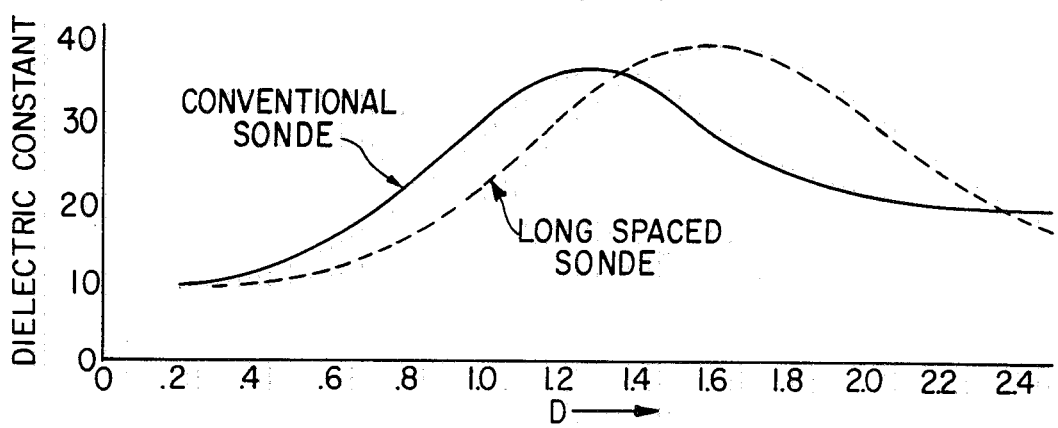
FIG. 1 is a plot of the measurement of dielectric constants versus penetration depth into the earth formation of a conventional well logging sonde and of a long spaced well logging sonde constructed in accordance with the present invention.

As can be seen in FIG. 1, which is a plot of dielectric constant measurement versus distance into an earth formation from a borehole, that the response of the present invention, hereinafter referred to as a long spaced sonde, is better than the response of the conventional sonde of the aforementioned U.S. patent.

The improvement in response is attributable to a change in the spacing between the transmitter and receiver coils. For example, the conventional sonde has a spacing of 24 inches between the transmitter and the nearest receiver coil and another spacing of 40 inches between the transmitter and the furthest receiver coil. The long spaced sonde has a distance of 40 inches between the transmitter coil and the nearest receiver coil and 56 inches between the transmitter coil and the furthest receiver coil. The distance between receiver coils is the same for the conventional sonde and the long spaced sonde.

The response of the long spaced sonde is further enhanced by utilization of greater power in the transmission of electromagnetic energy into the earth formation. The conventional sonde transmitted at approximately 2 watts power while the long spaced sonde transmits at approximately 30 watts power.

Figure 2:
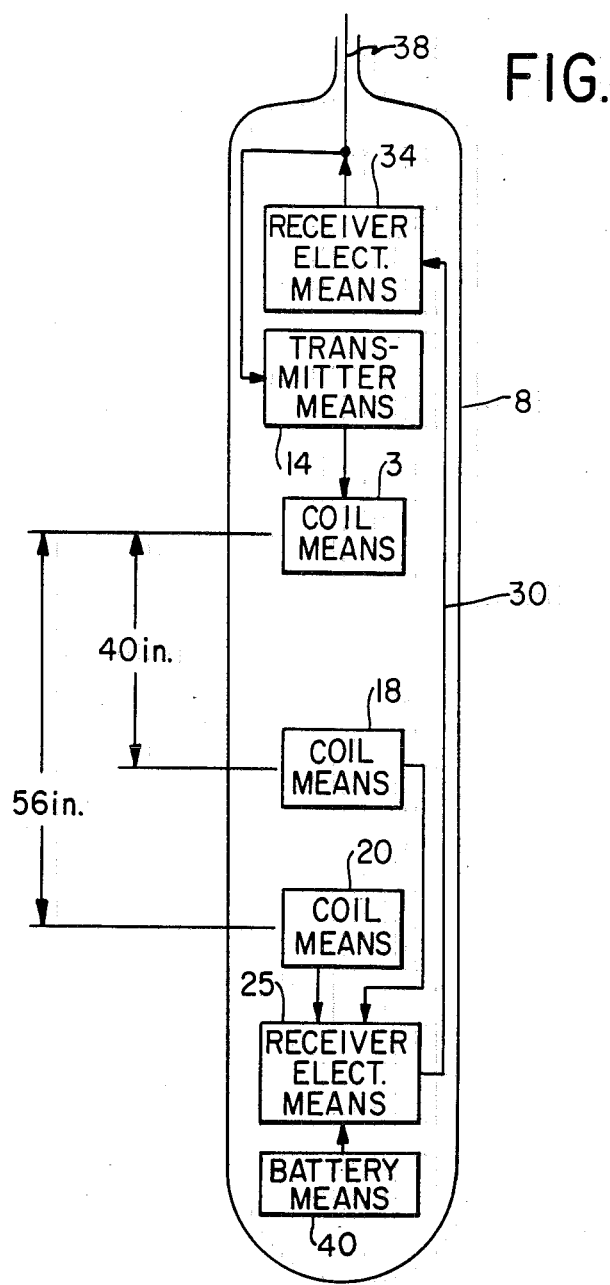
FIG. 2 is a simplified block diagram of a long spaced well logging sonde constructed in accordance with the present invention.

With reference to FIG. 2 the power improvement is achieved by rearrangement of the elements of the conventional sonde in addition to the increased spacing. In this regard, transmitting coil means 3 is located near the well logging cable end of sonde 8 and is energized by transmitter means 14. By locating the transmitter means 14 and transmitter coil means 3 in sonde 8 closer to the well logging cable, power can be provided to transmitter means 14 from the surface to enable it to transmit at the higher power level. The conventional sonde requires that transmitter means therein operate from a battery which limited the amount of power of operation.

Receiver coil means 18 is located 40 inches along a longitudinal axis of sonde 8 while receiver coil means 20 is 56 inches from transmitter coil means 3 further along the same axis. Signals, representative of the received electromagnetic energies by coil means 18 and 20, are provided to receiver electronic means 25. Although the details of receiving electronic means 25 are not necessary to an understanding of the present invention it is suffice to say that the mixers, the local oscillators, and the voltage control oscillators of the aforementioned U.S. patent are located in receiver electronic means 25 and operate in a like manner. In addition, receiving electronics 25 includes photo diode circuits for converting the outputs of the voltage control oscillators to light signals which are then carried by fiber optic cabling 30 to receiver electronics means 34. Again the details of receiver electronic means 34 are not really necessary to an understanding of the present invention. Receiver electronics 34 includes light detectors for converting the light from fiber optic cabling 30 to electrical signals which are applied to amplifiers whose signals are then summed and provided to a cable driver and hence to well logging cable 38 as was done in the aforementioned U.S. patent. Well logging cable 38 is also connected to transmitter means 14 to provide the necessary operating voltages to transmitter means 14. An operating voltage for receiver electronic means 25 is provided by battery means 40.

The use of fiber optic cabling 30 permits the signals from receiver electronic means 25 to pass transmitter coil means 3 without incurring electromagnetic interference with the signal or interfering with the transmitted energy from coil means 3.

The present invention as hereinbefore described is an improvement to a conventional dielectric well logging sonde that will allow the sonde to be used with deeper penetration into fluid invaded zones. It involves the longer spacing of the receiver coils away from the transmitter coil as well as an increased power provided to the transmitter coil.

What is claimed is:

1. A dielectric well logging sonde comprising:
   a housing;
   transmitter means located within said housing for transmitting electromagnetic energy at a predetermined dielectric logging frequency and at a power level substantially greater than 2 watts; and
   a pair of receiver means, each receiver means being means for receiving electromagnetic energy and providing a signal representative of the received electromagnetic energy, one receiver means being located at least 40 inches from the transmitter means and the other receiver means being located at least 50 inches from the transmitting means.

2. A sonde as described in claim 1 in which the transmitter means is located near the cable end of the sonde and connected to a well cable so that operating voltages for the transmitter means may be provided by way of the cable.

3. A sonde as described in claim 2 in which the power level is approximately 30 watts.

* * * * *